United States Patent [19]

Heitert

[11] 3,974,808
[45] Aug. 17, 1976

[54] AIR INTAKE DUCT ASSEMBLY

[75] Inventor: John S. Heitert, Westland, Mich.

[73] Assignee: Ford Motor Company, Dearborn, Mich.

[22] Filed: July 2, 1975

[21] Appl. No.: 592,843

[52] U.S. Cl. .............................. 123/122 D; 236/13; 123/122 H
[51] Int. Cl.² ....................................... F02M 31/00
[58] Field of Search ...... 236/13; 123/122 D, 122 H, 123/122 R

[56] References Cited
UNITED STATES PATENTS

| | | | |
|---|---|---|---|
| 3,450,119 | 6/1969 | Sendelbach | 123/122 D |
| 3,563,007 | 2/1971 | Clark | 123/122 D |
| 3,744,715 | 7/1973 | Maddocks | 123/122 H |
| 3,801,078 | 4/1974 | Denton | 123/122 H |

*Primary Examiner*—Charles J. Myhre
*Assistant Examiner*—R. H. Lazarus
*Attorney, Agent, or Firm*—John J. Roethel; Keith L. Zerschling

[57] ABSTRACT

An air intake duct assembly for an internal combustion engine air cleaner, the duct assembly including a duct having an ambient air inlet, a branch exhaust manifold heated air inlet and an air discharge outlet adapted to be coupled to an air cleaner. A flap valve is pivotally mounted within the duct, the flap valve being movable relative to the air inlet to proportion the flow of ambient and heated air through the duct. A spring means normally biases the flap valve toward an ambient air inlet closed position. A longitudinally expandable-contractible temperature responsive element is mounted in the air duct contiguous to the discharge outlet for sensing the temperature of air flowing therethrough.

The improvement comprises an axially loaded spring steel driveshaft coupling the temperature responsive element to the flap valve to bias the latter against the resistance of the spring means from the ambient air inlet closed position toward the heated air inlet closed position as the temperature of the air flowing through the duct increases. The driveshaft is constructed and arranged so that upon the flap valve reaching a heated air inlet fully closed position it buckles to accommodate overtravel of the temperature responsive element upon the continued expansion of the latter.

4 Claims, 4 Drawing Figures

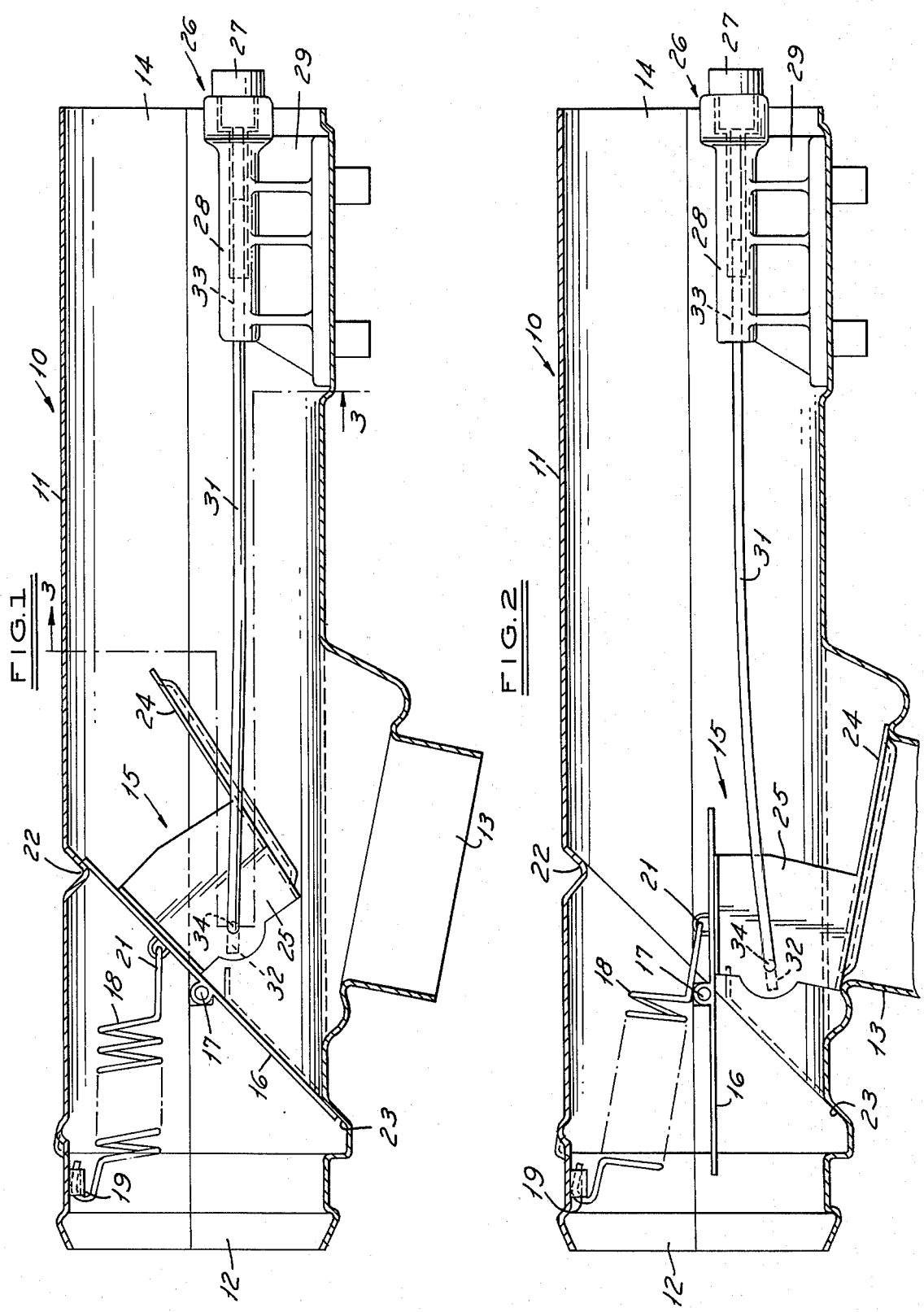

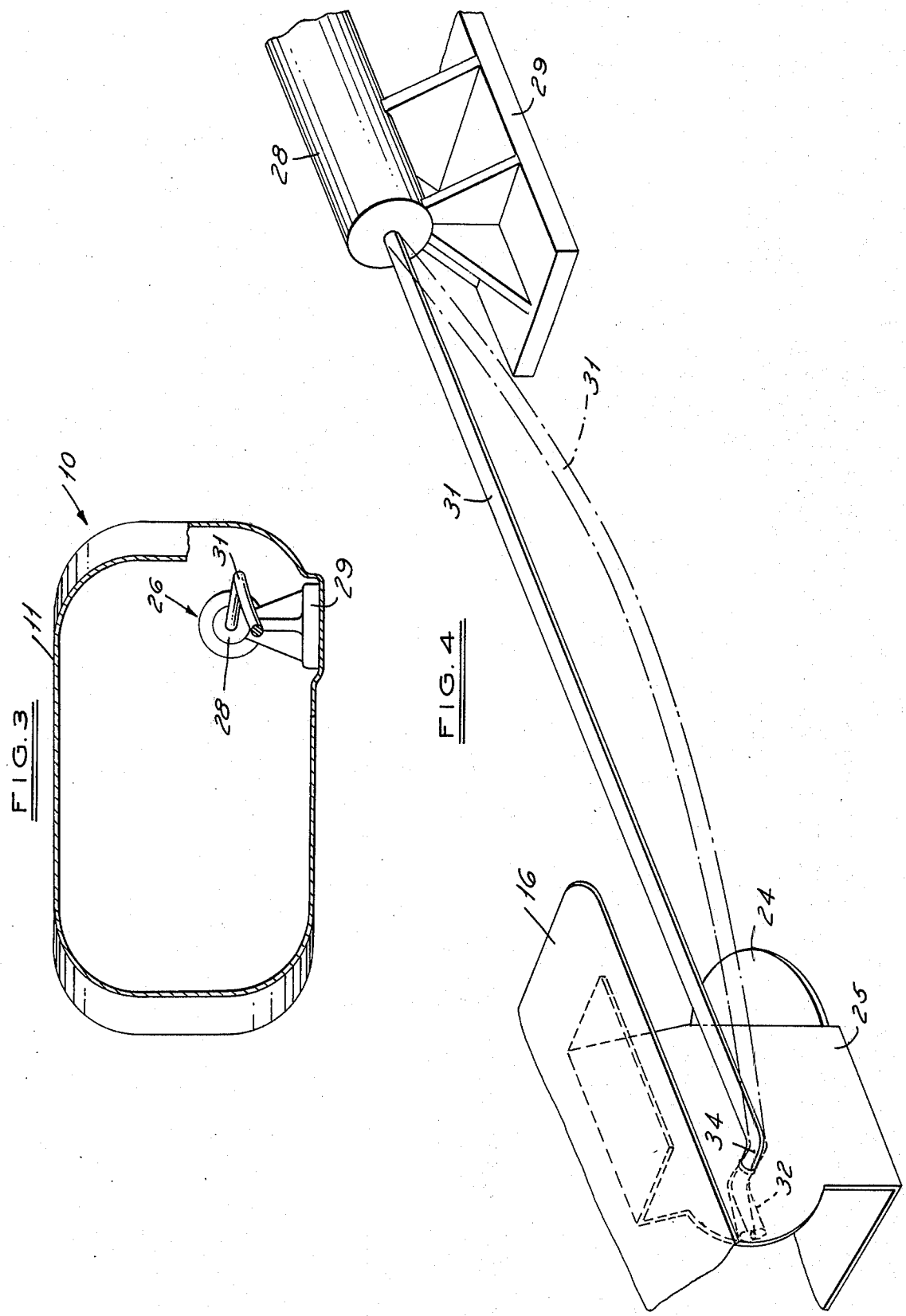

AIR INTAKE DUCT ASSEMBLY

BACKGROUND OF THE INVENTION

Reference may be made to U.S. Pat. Nos. 3,450,119 issued June 17, 1969 to R. E. Sendelbach for an "Air Cleaner Air Inlet Construction" and 3,801,078 issued Apr. 2, 1975 to D. G. Denton for "Thermostatically Controlled Valve Assembly". Both patents disclose air intake duct assemblies for the internal combustion engine air cleaners, the duct having an air inlet for ambient air, a branch exhaust manifold heated air inlet and an air discharge outlet adapted to be coupled to an air cleaner. A flap valve controlled by a temperature sensitive or responsive element responsive to changes in the temperature of the air being discharged from the duct proportions the mix of ambient and heated air passing through the duct.

In both patents the temperature responsive element is a wax or similar pellet that is expandable and contractible in a linear manner. The element is coupled by a driveshaft to the flap valve. The temperature responsive element moves the driveshaft and thereby the flap valve to a heated air inlet fully closed position at a predetermined air temperature. If the temperature rises above the predetermined value, the temperature responsive element overexpands or overtravels. It is necessary to compensate for the overtravel to avoid permanent deformation of the driveshaft or the flap valve. In both the above patents, the override compensation is accomplished by a spring means interposed between the driveshaft and the flap valve.

It is an object of the present invention to utilize an axially loaded, buckling, straight beam driveshaft between the temperature sensitive element and the flap valve, thus eliminating the override coil spring as used in the structure disclosed in U.S. Pat. No. 3,450,119 or the compound wound spring as disclosed in U.S. Pat. No. 3,801,078.

SUMMARY OF THE INVENTION

The present invention relates to an air intake duct assembly for an internal combustion engine air cleaner, the duct having an ambient air inlet, a branch exhaust manifold heated air inlet and an air discharge outlet adapted to be coupled to an air cleaner. A flap valve is pivotally mounted within the duct, the flap valve being movable relative to the air inlets to proportion the flow of ambient and heated air through the duct. A spring means normally biases the flap valve toward an ambient air inlet closed position. The longitudinally expandable-contractible temperature responsive element is mounted in the air duct contiguous to the discharge outlet for sensing the temperature of air flowing therethrough.

The improvement comprises an axially loaded spring steel driveshaft coupling the temperature responsive element to the flap valve to bias the latter against the resistance of the spring means from the ambient air inlet closed position toward the heated air inlet closed position as the temperature of the air flowing through the duct reaches a predetermined value. The driveshaft is constructed and arranged so that upon the flap valve reaching a heated air inlet fully closed position the driveshaft will buckle to accommodate overtravel of the temperature responsive element upon continued expansion of the latter.

BRIEF DESCRIPTION OF THE DRAWINGS

Further features and advantages of the present invention will be made more apparent as this description proceeds, reference being had to the accompanying drawings, wherein:

FIG. 1 is a side view in part sectional of an air intake duct assembly for the air cleaner of an internal combustion engine in a full hot inlet open position;

FIG. 2 is a view in part similar to FIG. 1 illustrating the operative parts of the duct assembly in a full ambient air inlet open position;

FIG. 3 is an end view taken on the line 3—3 of FIG. 1; and

FIG. 4 is a schematic perspective view illustrating the buckling action of the driveshaft in response to overtravel of the discharge air temperature responsive element.

DETAILED DESCRIPTION OF THE INVENTION

Referring now to FIGS. 1 and 2, there is shown an air intake duct assembly, generally designated 10, for an internal combustion engine air cleaner (not shown). The duct assembly 10 includes a duct 11 having an ambient air inlet 12, a branch or heated air inlet 13 adapted to be attached to a heat pipe (not shown) which provides a source of air heated by the engine exhaust manifold and an air discharge outlet 14 adapted to be coupled to an air cleaner inlet. The relationship of the air intake duct assembly to the internal combustion engine as described above appears more fully in the Sendelbach patent.

A flap valve 15 is pivotally mounted within the duct. The flap valve 15 comprises a large valve plate 16 located near the intake end 12 of the duct 11. The valve plate 16 is centrally hinged on a pivot shaft 17 extending laterally of the duct. The valve plate 16 in air inlet fully closed position extends angularly across the duct and is urged into fully closed position by a tension spring 18 anchored at one end 19 to the upper wall of the duct and at its other end 21 to the valve plate 16 above the pivot shaft 17 of the latter. Stops 22 and 23 formed in the upper and lower walls of the duct 11 determine the fully closed position of the valve plate 16.

The flap valve 15 has a second valve plate 24 spaced from the valve plate 16. The valve plate 24 is supported on spaced legs 25 secured to the upper half (as viewed in FIG. 1) of the valve plate 16. The valve plate 24 is swingable bodily about the pivot shaft 17 in an arcuate path and seats in the heated air inlet 13 to close the latter off to prevent the flow of heated air into the duct 11.

The flap valve 15 is movable relative to the air inlets 12 and 13 to proportion the flow of ambient and heated air through the duct 11. In FIG. 1, the flow of ambient air is completely shut off by the position of the valve plate 16 and only heated air rom the inlet 13 flows through the duct 11. FIG. 2 represents the opposite condition in which the heated air inlet 13 is closed off by the valve plate 24 and the valve plate 16 is in a neutral position allowing full ambient air flow through the duct 11. The flap valve 15 may be positioned in any position intermediate the two extreme positions.

The position of the flap valve 15 is controlled by a longitudinally expandable-contractible temperature responsive element in the air duct 11 contiguous to the discharge outlet for sensing the temperature of air flowing through the discharge end of the duct 11.

The temperature responsive element 26 may be of a known type, such as a wax or similar pellet that expands and contracts in a linear manner in response to changes in temperature from a predetermined set level. The wax pellet 27 is mounted in a sleeve 28 supported on a bracket 29.

Expansion of the temperature responsive element or wax pellet 27 is transmitted to the flap valve 15 by an elongated rod or driveshaft 31 having a crook 32 at its end opposite the end 33 contained in the sleeve 28. The end 33 of the rod 31 is in abutting relation to the wax pellet 27. The crook 32 passes through an aperture 34 in a leg 25 of the flap valve 15.

The driveshaft 31 is an axially loaded, cylindrical, spring steel rod which operates as an axially loaded buckling straight beam. The dimensions of the driveshaft are controlled to allow buckling after exceeding the load required to fully open the valve 15 to permit only ambient air flow through the duct 11. In this position, the valve plate 24 closes the heated air inlet 13. Due to this construction and arrangement, the valve motion is linear with respect to piston motion. This would not be true for a bent or "kinked" driveshaft.

In full hot position, that is, the position in which the ambient air inlet 12 is closed by valve plate 16 and the heated air inlet 13 is opened, as shown in FIG. 1, the driveshaft 31 must be stiff enough to act as a rigid column. In this full hot position buckling must not occur or the desired valve motion will be hampered. As heated air flows through the duct 11, the wax pellet 27 expands and drives the driveshaft 31 against the resistance of the spring 18 in a direction to rotate the flap valve 15 about its pivot shaft 17 (in a clockwise direction as viewed in FIG. 1). In a typical installation, the force transmitted from the wax pellet, through the driveshaft 31 to the valve 15, is on the order of twenty pounds. This is the force required to initiate valve motion. As the valve moves to a fully closed position relative to the heated air inlet 13, a critical buckling load is approached. The critical buckling load is simply the load at which the rod is no longer stable and buckling occurs.

In an installation in which the force required to initiate valve motion is on the order of 20 pounds, the critical load would be on the order of 69 pounds. Once the buckling motion begins, however, the wax-pellet overtravel or overexpansion is absorbed and no damage will occur to the system.

FIG. 3 is an end view of the buckled driveshaft and FIG. 4 is a schematic view showing the lateral movement of the driveshaft that occurs as the wax pellet expands into the overtravel phase.

It is to be understood that this invention is not limited to the exact construction illustrated and described above, but that various changes and modifications may be made without departing from the spirit and scope of the invention as defined by the following claims.

I claim:

1. An air intake duct assembly for an internal combustion engine air cleaner, the duct assembly including a duct having an ambient air inlet, a branch exhaust manifold heated air inlet and an air discharge outlet adapted to be coupled to an air cleaner, a flap valve pivotally mounted within the duct, the flap valve being movable relative to the air inlets to proportion the flow of ambient and heated air through the duct, spring means normally biasing the flap valve toward an ambient air inlet closed position, and a longitudinally expandable-contractible temperature responsive element in the air duct contiguous to the discharge outlet for sensing the temperature of air flowing therethrough, wherein the improvement comprises:

an axially loaded spring steel driveshaft coupling the temperature responsive element to the flap valve to bias the latter against the resistance of the spring means from the ambient air inlet closed position toward the heated air inlet closed position as the temperature of the air flowing through the duct reaches a predetermined value, the driveshaft being constructed and arranged so that upon the flap valve reaching a heated air inlet fully closed position the driveshaft will buckle laterally to accommodate overtravel of the temperature responsive element if the latter continues to expand.

2. An air intake duct assembly according to claim 1, in which:

the driveshaft transmits longitudinal expansion of the temperature responsive element to the flap valve.

3. An air intake duct assembly according to claim 2, in which:

the driveshaft is cylindrical.

4. An air intake duct assembly for an internal combustion engine air cleaner, the duct having an ambient air inlet, a branch exhaust manifold heated air inlet and an air discharge outlet adapted to be coupled to an air cleaner, a flap valve having a main flap centrally hinged within the duct to control ambient air flow into the duct, the flap valve having a secondary flap spaced from the main flap for closing off the heated air inlet upon the main flap being pivoted from ambient air inlet closed position to opened position, spring means extending between a wall of the duct and the main flap normally biasing the flap valve into ambient air inlet closed position, a longitudinally expandable-contractible temperature responsive element in the air duct for sensing the temperature of the air flowing through the air discharge outlet, and an axially loaded, cylindrical, spring steel driveshaft having one end in abutting relation to the temperature responsive element and its other end comprising a crank portion coupled to the flap valve eccentrically of the central hinge of the latter, the driveshaft upon expansion of the temperature responsive element being longitudinally shifted to swing the flap valve against the resistance of the spring means from the ambient air inlet closed position toward the heated air inlet closed position as the temperature of the air increases, the driveshaft being sized to resiliently buckle after the load thereon required to fully close the heated air inlet is exceeded.

\* \* \* \* \*